356-153
Jan. 28, 1958
J. A. MILLS
2,821,104
OPTICAL TESTING APPARATUS FOR MEASURING DEVIATION OF POINTS FROM A PLANE
Filed May 31, 1955
7 Sheets-Sheet 1
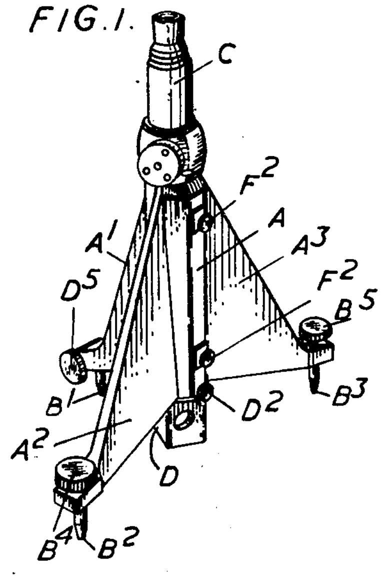
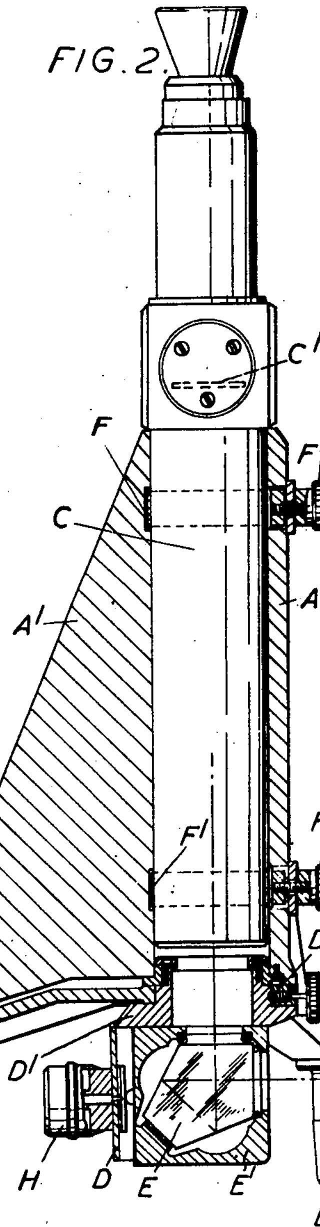
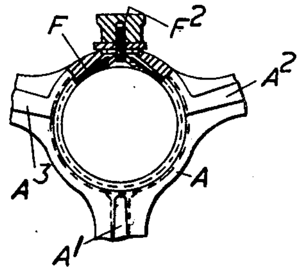
Inventor
John A. Mills
By Holcombe, Wetherill & Brisebois
Attorneys Jan. 28, 1958 J. A. MILLS 2,821,104
OPTICAL TESTING APPARATUS FOR MEASURING DEVIATION OF POINTS FROM A PLANE
Filed May 31, 1955 7 Sheets-Sheet 2
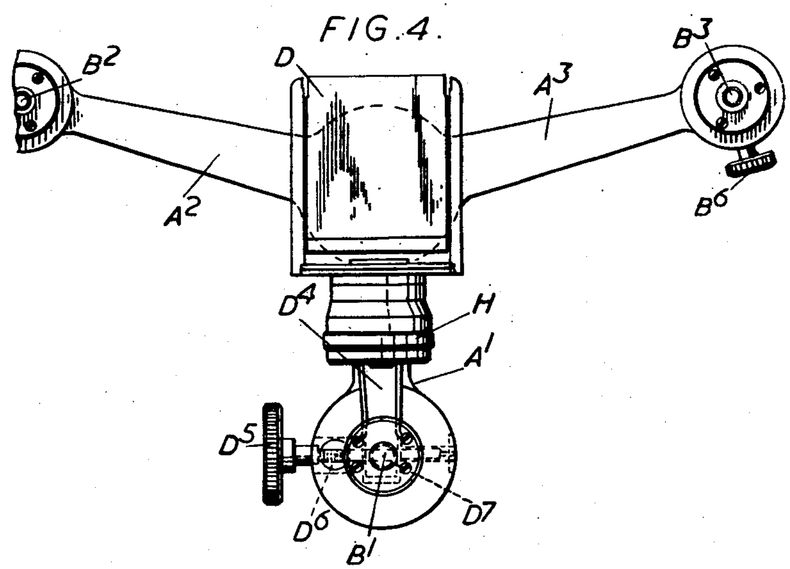
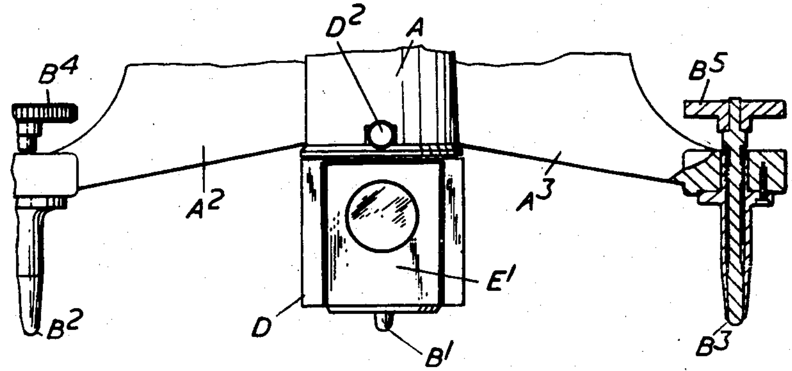
Inventor
John A. Mills
By Holcomb, Wetherill & Brisebois
Attorneys

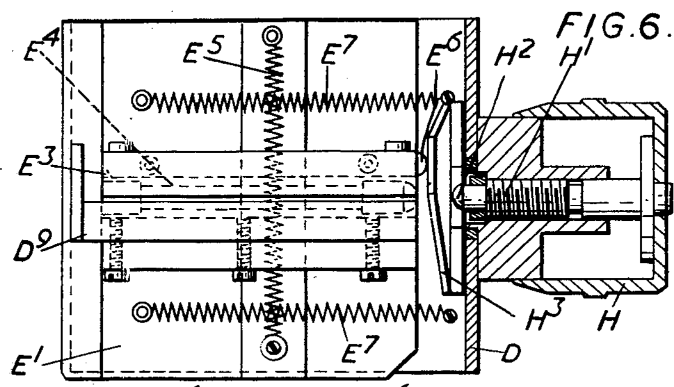
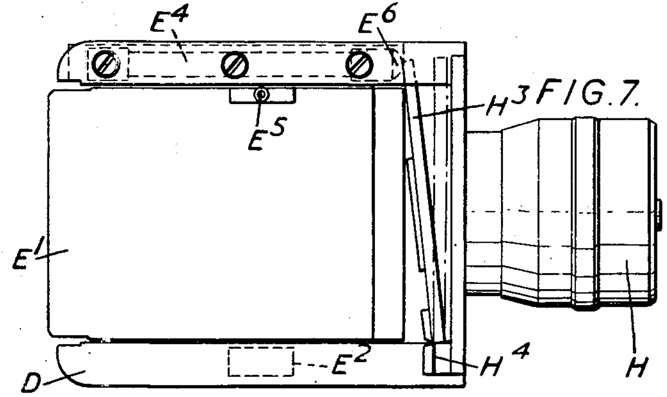
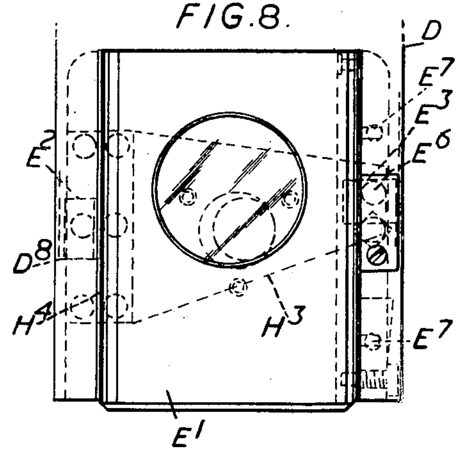
Inventor
John A. Mills
By Holcombe, Wetherill & Brisebois
Attorneys Jan. 28, 1958
J. A. MILLS
OPTICAL TESTING APPARATUS FOR MEASURING DEVIATION OF POINTS FROM A PLANE
2,821,104
Filed May 31, 1955
7 Sheets-Sheet 4
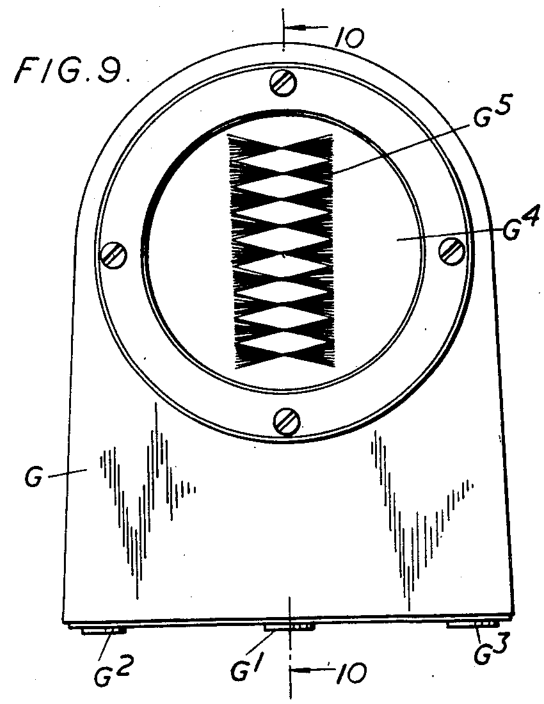
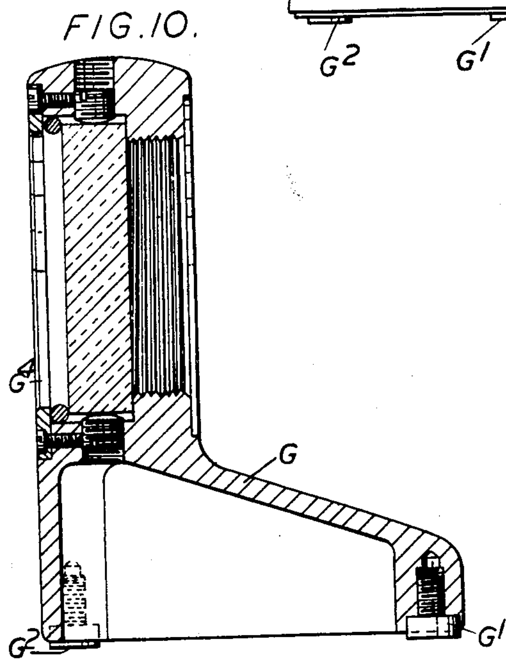
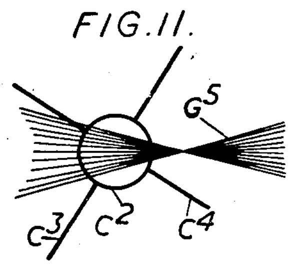
Inventor
John A. Mills
By Holcombe, Wetherill & Brisebois
Attorneys

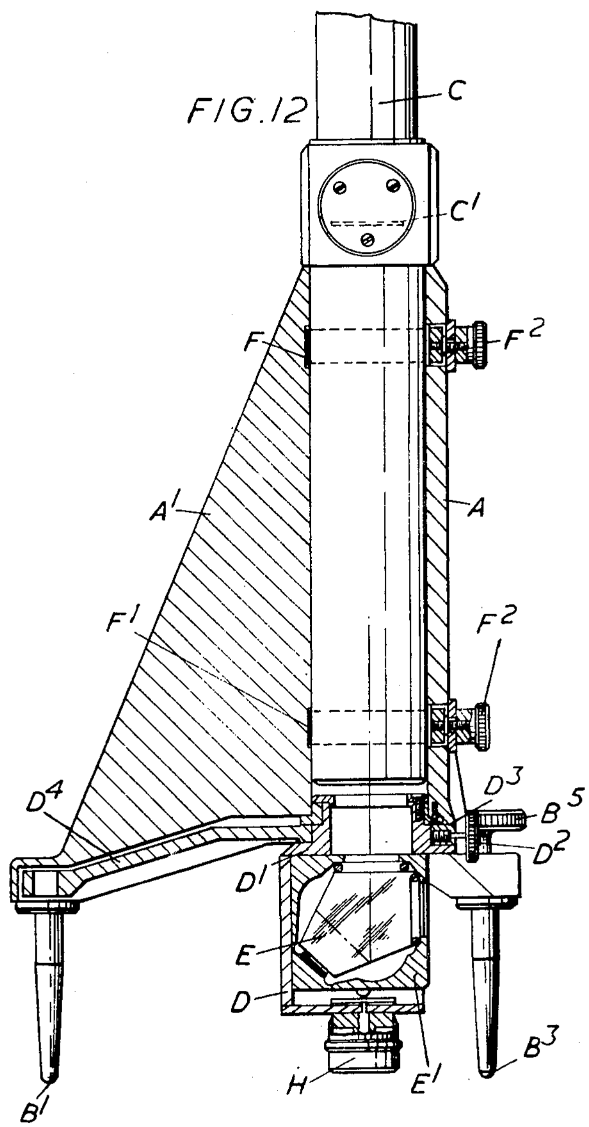
Inventor
John A Mills
By
Holcomb, Wetherill & Brisebois
Attorneys

Jan. 28, 1958
J. A. MILLS
2,821,104
OPTICAL TESTING APPARATUS FOR MEASURING DEVIATION OF POINTS FROM A PLANE
Filed May 31, 1955
7 Sheets-Sheet 6
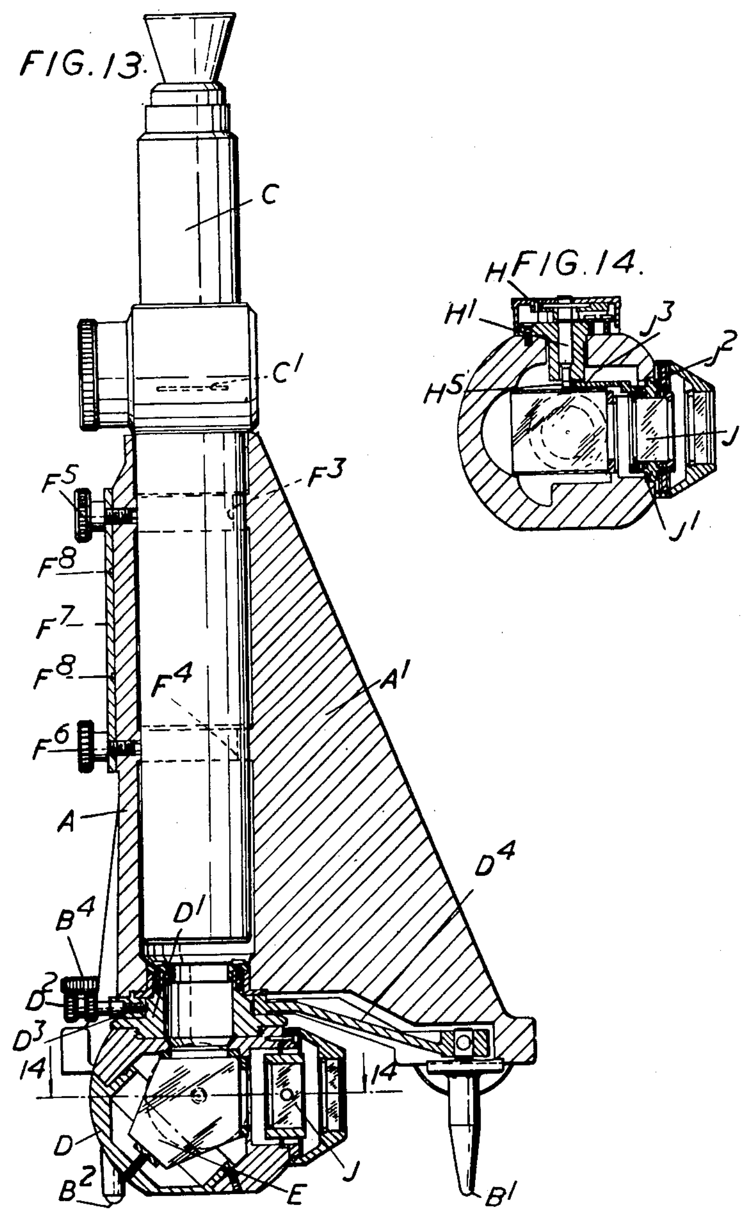
Inventor
John A. Mills
By Holcombe, Wetherill & Brisebois
Attorneys Jan. 28, 1958 J. A. MILLS 2,821,104
OPTICAL TESTING APPARATUS FOR MEASURING DEVIATION OF POINTS FROM A PLANE
Filed May 31, 1955 7 Sheets-Sheet 7
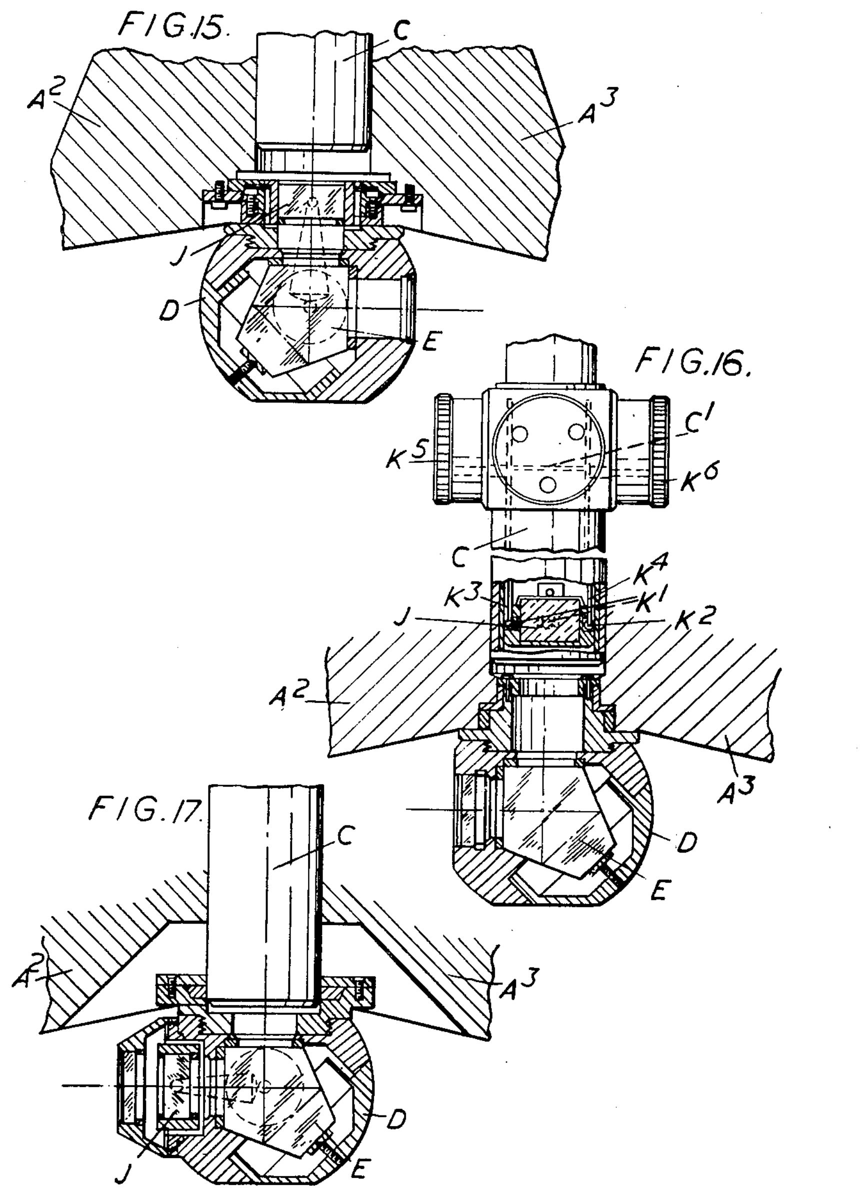
Inventor
John A. Mills
By Holcombe, Wetherill & Brisebois
Attorneys

United States Patent Office 2,821,104

Patented Jan. 28, 1958

2,821,104

OPTICAL TESTING APPARATUS FOR MEASURING DEVIATION OF POINTS FROM A PLANE

John Alfred Mills, Leicester, England, assignor to Kapella Limited, Leicester, England, a British company Application May 31, 1955, Serial No. 512,217

Claims priority, application Great Britain June 3, 1954

10 Claims. (Cl. 88—14)

This invention relates to optical apparatus for testing the accuracy of a set of target mountings nominally in a plane and has for its object to provide an improved and compact apparatus of this kind for effecting the desired test with a very high degree of accuracy.

The apparatus according to the invention comprises a framework, a telescope carried by the framework, a housing rotatably mounted on the framework with its axis of rotation accurately aligned with the optical axis of the telescope, a pentaprism carried by such housing for deflecting the optical axis of the observation beam accurately through a right angle and thereby defining a plane of sight accurately at right angles to the optical axis of the telescope, means for adjusting the framework to cause such plane of sight to coincide with the plane defined by the targets on three of the mountings to be tested, whereby by sighting the apparatus in turn on the targets carried by the other mountings to be tested any error in positioning thereof relatively to the plane defined by the three selected targets will be apparent, and a micrometer device for adjusting laterally with respect to the optical axis of the telescope the image of the target being viewed.

The micrometer adjusting device is preferably carried by the rotatable housing so as to rotate therewith, and may be arranged in various ways. Thus, in one arrangement, the micrometer adjusting device comprises a micrometer head, and means whereby operation of such head causes the pentaprism to move bodily in the rotatable housing in the direction of the optical axis of the observation beam either before or after deflection of such axis by the pentaprism. Preferably, however, the micrometer adjusting device comprises an optical deviator in the path of the observation beam passing through the pentaprism, and a micrometer head for adjusting such deviator. For example, the optical deviator may comprise a parallel-sided transparent block mounted to tilt under the control of the micrometer head about an axis in or parallel to the plane of sight and at right angles to the optical axis of the observation beam passing through the block.

The means for adjusting the framework conveniently comprises three supporting feet for supporting the framework, two of such feet being adjustable to tilt the framework respectively about two mutually inclined axes.

The invention may be carried into practice in various ways, but some convenient alternative practical arrangements of testing apparatus according thereto are illustrated in the accompanying drawings, in which Figure 1 is a perspective view of one arrangement, Figure 2 is a vertical sectional view of the arrangement of Figure 1, Figure 3 is a plan view of the telescope tube, with part in section to show the mounting of the telescope in the tube, Figures 4 and 5 are respectively an under-plan view and a front elevation (with part in section) of the housing at the base of this arrangement, Figures 6, 7 and 8 illustrate the mounting of the pentaprism in the housing, Figure 6 being a sectional side elevation with the prism mount in elevation, Figure 7 an under-plan and Figure 8 a front elevation, Figures 9 and 10 respectively show in front elevation and in section (on the line 10—10 of Figure 9) a convenient construction of remote target for use with the arrangement of Figures 1–8, Figure 11 illustrates a typical view of this target as seen through the telescope, Figure 12 is a view similar to that of Figure 2 illustrating an alternative arrangement, Figure 13 is a vertical sectional view of a further alternative arrangement, Figure 14 is a horizontal section on the line 14—14 of Figure 13, and Figures 15, 16 and 17 are partial vertical sectional views of three other alternative arrangements.

In all these arrangements, as clearly shown in the arrangement of Figures 1–8, the optical system is carried by a framework consisting of an approximately vertical tube A from which three brackets $A^1$, $A^2$, $A^3$ radiate, each having a foot $B^1$ or $B^2$ or $B^3$ at its outer end. The three feet are arranged to lie at the corners of a right-angled triangle, and the two feet $B^2$, $B^3$ at the ends of the hypotenuse of such triangle are adjustable in height on their brackets $A^2$, $A^3$. It is thus possible to tilt the axis of the tube A through a small angle about either of two mutually perpendicular axes. Each adjusting screw $B^4$ or $B^5$ can be clamped firmly in position after the adjustment by means of a clamping screw $B^6$.

The tube A serves to house a telescope C, and also at its lower end (beneath the brackets) a housing D mounted to rotate about the optical axis of the telescope C. This housing D contains a pentaprism E acting to deflect such optical axis accurately through a right angle, thus defining a plane of sight which lies at right angles to such optical axis and whose inclination to the horizontal can be varied slightly by adjustment of the feet $B^2$, $B^3$ on the framework.

The telescope tube C is clamped firmly within the framework tube A, within which it is a close fit, and it is desirable to choose a form of clamp which will minimise distortion of the telescope tube and the errors involved in such distortion. For this purpose, clamping may be effected (as shown in Figures 2 and 3) by means of two spaced steel tapes F, $F^1$, each of which is wrapped round the telescope tube C and can be tightened by means of a hand knob $F^2$ mounted on the framework tube A, thus distributing the clamping pressure around the circumference of the telescope tube. Preferably, however, (as shown in Figure 13) a portion of the framework tube A is internally relieved on one side to provide two pairs of edges $F^3$, $F^4$ against which the telescope tube C can be pressed by spaced adjusting screws $F^5$, $F^6$ which pass through holes in the framework tube A and engage in a plate $F^7$ resting against the outside of the framework tube, this plate being weakened by saw cuts $F^8$ so that when the pressure exerted by the adjusting screws $F^5$, $F^6$ exceeds a predetermined value, the plate $F^7$ will yield slightly and thus prevent or minimise distortion of the telescope tube C.

The rotatable housing D on the lower end of the tube A can be rotated by hand in order to be brought approximately into the desired position. Fine adjustment of the housing position is then effected by a clamping screw $D^2$ for clamping a cylindrical neck $D^1$ on the housing to a surrounding collar $D^3$, to which is attached a lever $D^4$, which may conveniently be mounted just beneath the framework bracket $A^1$ carrying the non-adjustable foot $B^1$. This collar $D^3$ is operated by a "tangent" screw $D^5$ mounted on such framework bracket $A^1$ in order to bring the housing D accurately into the correct angular position. Such tangent screw $D^5$ may conveniently bear two screw-threads $D^6$, $D^7$ (Figure 4) of slightly different pitch, one of which cooperates with a thread on the framework bracket $A^1$ and the other with a thread on the lever $D^4$.

The apparatus is primarily intended for use in testing whether a number of target mountings, nominally all in a plane approximately parallel to that on which the three framework feet $B^1$, $B^2$, $B^3$ rest, are or are not in fact accurately coplanar with one another. For example, the target mountings may rest on selected points of a large machine bed whose flatness is to be checked, or on parts of a large structure which have to be coplanar. The test is carried out by sighting the telescope C in turn on the targets, the framework feet $B^2$, $B^3$ first being adjusted to get three selected targets accurately in the plane of sight. Such three targets should preferably be selected with a view to minimising errors, and it is useful, if possible, to select two targets on opposite sides of the apparatus more or less in line with one of the axes about which the framework can be adjusted and the third in a direction more or less at right angles to such line.

A convenient form of target mounting (shown in Figures 9 and 10) consists of a casing G mounted on three feet $G^1$, $G^2$, $G^3$ and bearing a transparent target $G^4$ lying accurately in a plane perpendicular to the plane of support of the three feet, the centre of the target $G^4$ being at a height above the feet $G^1$, $G^2$, $G^3$ approximately the same as the height of the plane of sight of the apparatus above its supporting feet $B^1$, $B^2$, $B^3$. Whilst other forms of target may be used, it is especially convenient to employ one having a set of numbered X markings $G^5$ vertically aligned and at equal spacings, the two cross-lines of each X lying at equal small angles to the horizontal and having the narrow-angle spaces between them at the two sides shaded or coloured to contrast with clear areas in the broad-angle spaces between the lines. Such a target provides convenient and readily discernible sighting points, and is very useful for cooperation (as indicated in Figure 11) with a telescope graticule $C^1$ (Figure 2) having a central circle $C^2$ from the outside only of which the usual rectangular cross-lines $C^3$, $C^4$ radiate. Any one of the numbered X markings $G^5$ on the target $G^4$ can be selected for sighting on, thus readily accommodating small differences in height between the plane of sight and the plane of the target centres.

Whilst it might sometimes be practicable to adjust the parts, on which the target mountings rest, during the test to bring them into the correct positions, accurately coplanar with each other, it will usually be required to utilise the test for measuring the errors in positioning of all the target mountings, and subsequently to effect such corrections as may be necessary. The apparatus according to the invention enables such measurement to be effected with a high degree of accuracy, and the various arrangements to be described differ from one another in the manner in which such measurement is effected.

It will be appreciated that, when the plane of sight of the apparatus has been brought by adjustment of the framework feet $B^2$, $B^3$ into coincidence with the plane defined by the targets $G^4$ on the three selected mountings, the subsequent test on the remaining targets will be to determine whether their centres lie in or above or below such plane, and an error will therefore appear (provided the tangent screw $D^5$ has been properly adjusted) as a lateral displacement (as indicated in Figure 11) of the image of the centre of the target $G^4$ along the diameter of the telescope graticule $C^1$ which lies parallel to the optical axis of the observation beam from the target $G^4$ to the pentaprism E. The measurement of the error is effected, in each of the arrangements now to be described, by means of a micrometer head H, operation of which causes the target image to be displaced laterally along the said diameter to make it accurately concentric with the centre of the telescope graticule circle $C^2$.

In the first arrangement (shown in Figures 1–8), the micrometer head H causes the pentaprism E to be displaced in its housing D in the direction of the optical axis of the observation beam from the target $G^4$ to the pentaprism E. For this purpose, the micrometer head H is mounted on the rear wall of the rotatable housing D (the front of such housing being open to permit the passage of the observation rays from the target) and acts when operated to move the pentaprism mount $E^1$ along guides extending from front to rear in the housing D. The arrangement of such guides and the associated mechanism may vary, but in one convenient arrangement (shown in Figures 6–8) the pentaprism mount $E^1$ has projecting from one side wall a roller $E^2$ on a ball race which runs along a flat guide surface $D^8$ on the housing, whilst from its other side wall projects a V-notch $E^3$ resting on a roller $E^4$ which in turn rests on another V-notch $D^9$ carried by the housing. A spring $E^5$ is provided to urge the pentaprism mount $E^1$ down on to the two side guides, such spring being located close to the V-notches $E^3$, $D^9$. The roller $E^4$ between the two V-notches is preferably relieved in its central portion throughout most of its length so that the support is at two short portions near the ends of the V-notches. The screw-threaded spindle $H^1$ of the micrometer head H has a rounded end $H^2$ which engages with the midpoint of a lever $H^3$ pivoted by means of a ligament hinge $H^4$ near one side edge of the rear wall of the housing D, the free end of the lever $H^3$ engaging with a rounded projection $E^6$ on the end of the V-notch $E^3$ carried by the pentaprism mount $E^1$, springs $E^7$ being provided to urge the mount $E^1$ towards the rear end wall of the housing D.

The second arrangement (Figure 12) differs from the first in that the micrometer head H is mounted in the bottom wall of the housing D and acts to move the pentaprism mount $E^1$ in the direction of the optical axis of the telescope C along suitable guides, which may for example be arranged in a manner analogous to that above described. It will be clear that such movement of the pentaprism E has the same effect on the target image as movement along the axis of the observation beam.

In the third arrangement (Figures 13 and 14), the pentaprism E remains fixed relatively to the rotatable housing D, and the lateral displacement of the target image is effected by means of an optical deviator mounted in a fitting in the front wall of the housing D so as to be interposed in the path of the rays from the target $G^4$ to the pentaprism E. In one convenient construction, this deviator consists of a parallel-sided glass block J mounted to pivot about an axis $J^1$ lying in or parallel to the plane of sight at right angles to the optical axis of the observation beam from the target $G^4$ to the pentaprism E. Thus, the mount for the block carries two stub shafts $J^1$, $J^2$ suitably journalled in the side walls of the housing D, one of these stub shafts $J^2$ carrying a toothed sector $J^3$, which engages with a pinion $H^5$ carried on the spindle $H^1$ of the micrometer head H, which in this case is mounted in one side wall of the rotatable housing D. Thus, operation of the micrometer head H will cause the block J to tilt about its axis $J^1$, $J^2$ in one direction or the other, so that the optical axis of the observation beam will be incident at an angle to the normal to the surface of the block and will therefore be refracted towards one side or the other, thus causing the desired lateral displacement of the target image.

The fourth arrangement (Figure 15) differs from the third in that the deviator block J is mounted in the top of the housing D above the pentaprism E in the path of the rays from the pentaprism to the telescope, the mechanism for tilting the block by operation of the micrometer head H being analogous to that for the third arrangement.

In operation, with each of these arrangements, the apparatus is first sighted in turn on the three selected targets and the necessary adjustments are made to ensure that the centres of these three targets lie accurately in the plane of sight. The apparatus is then sighted in turn on the remaining targets, and in each case the micrometer head H is operated to centralise the target image accurately on the telescope graticule $C^1$, the error (if any) in the positioning of the target being read off on the micrometer. When the complete test has been completed, the necessary adjustments are made to the parts carrying the target mountings under test in accordance with the measured errors, and the test is repeated to ensure that the adjustments have been correctly made.

It will be appreciated that the foregoing arrangements have been described by way of example only and may be modified in various ways within the scope of the invention.

Thus, it is not essential to the invention for the micrometer adjusting device to be carried by and to rotate with the pentaprism housing, and the desired measurement can be made with a micrometer-controlled deviator in the telescope. Such an arrangement is shown in Figure 16. In this alternative, however the deviator block J must be capable of rotation about two mutually inclined axes, in order that its resultant tilt shall be in the direction of the observation beam. For this purpose, the block mount is supported on three balls K, $K^1$, $K^2$ at the corners of a right-angled triangle. The ball K at the right-angled corner is fixed in position in the telescope, and the other two balls $K^1$ and $K^2$ are respectively carried by two rods $K^3$ and $K^4$, which pass up through the telescope tube for operation respectively by two micrometer heads $K^5$ and $K^6$, which together replace the single micrometer head H of the previous arrangements. Thus, operation of the two micrometer heads will cause the block J to tilt in two mutually perpendicular directions, and calculations must be made from the two micrometer readings to determine the height error of a particular target.

Again, it is also possible to mount the pentaprism housing D directly on the end of the telescope tube C, so that such tube rotates with the housing. Such an alternative is illustrated in Figure 17, wherein the housing D is arranged in the manner shown in Figures 13 and 14 except that it is secured to the lower end of the telescope tube C. In this case, however, highly accurate alignment of the optical axis of the telescope with the axis of rotation is essential, for any slight angular error will result in sweeping out a shallow cone of sight instead of a plane of sight during rotation, and even an angular error of only a few seconds of arc, might interfere with the accuracy of the measurements desired, in the case of distant targets. In this connection, it should be made clear that so long as the optical axis of the telescope is stationary, a slight angular error between such axis and the axis of rotation of the housing will be of negligible significance, for in such case the rotation will sweep out a plane of sight at right angles to the optical axis of the telescope and the slight angular error between such plane and the plane at right angles to the axis of rotation will be taken up by the adjustment of the feet of the apparatus.

What I claim as my invention and desire to secure by Letters Patent is:

1. Apparatus for testing the accuracy of positioning of a set of target mountings provided with sighting points nominally in a plane, comprising in combination a framework, a telescope carried by the framework, a housing rotatably mounted on the framework about an axis accurately aligned with the optical axis of the telescope, a pentaprism carried by such housing for deflecting the optical axis of an observation beam accurately through a right angle and thereby defining a plane of sight accurately at right angles to the optical axis of the telescope, means for adjusting the framework whereby such plane of sight can be brought into coincidence with the plane defined by the sighting points on three of the mountings to be tested and can thereafter be sighted in turn on the sighting points carried by the remaining mountings thus rendering apparent any error in positioning thereof relatively to the said plane, and a micrometer device controlling the path of the observation beam for laterally adjusting with respect to the optical axis of the telescope the image of the target being viewed.

2. Testing apparatus as claimed in claim 1, including means for mounting the micrometer device on the rotatable housing.

3. Testing apparatus as claimed in claim 2, in which the micrometer device comprises an optical deviator in the path of the observation beam passing through the pentaprism, and a micrometer head for adjusting such deviator.

4. Testing apparatus as claimed in claim 2, in which the micrometer device comprises a parallel-sided transparent block in the path of the observation beam passing through the pentaprism, means for mounting such block to tilt about an axis at right angles to the part of the optical axis of the observation beam passing through it, and a micrometer head for controlling the tilting of the block about its axis.

5. Testing apparatus as claimed in claim 2, in which the micrometer device comprises mounting means for the pentaprism in the rotatable housing whereby the pentaprism can move bodily in the housing in the direction of part of the observation beam passing through it, and a micrometer head for controlling such bodily movement of the pentaprism.

6. Testing apparatus as claimed in claim 1, in which the means for adjusting the framework comprises three supporting feet for the framework, and means for adjusting two of such feet whereby the framework can be adjusted respectively about two mutually inclined axes.

7. Testing apparatus as claimed in claim 6, including means for mounting the micrometer device on the rotatable housing.

8. Testing apparatus as claimed in claim 7, in which the micrometer device comprises a parallel-sided transparent block in the path of the observation beam passing through the pentaprism, means for mounting such block to tilt about an axis at right angles to the part of the optical axis of the observation beam passing through it, and a micrometer head for controlling the tilting of the block about its axis.

9. Testing apparatus as claimed in claim 6, in which the micrometer device comprises an optical deviator in the path of the observation beam passing through the pentaprism, and a micrometer head for adjusting such deviator.

10. Testing apparatus as claimed in claim 6, in which the micrometer device comprises mounting means for the pentaprism in the rotatable housing whereby the pentaprism can move bodily in the housing in the direction of part of the observation beam passing through it, and a micrometer head for controlling such bodily movement of the pentaprism.

References Cited in the file of this patent

UNITED STATES PATENTS

| | | |
|---|---|---|
| 1,660,833 | Cronjaeger | Feb. 28, 1928 |
| 2,682,804 | Clifford et al. | July 6, 1954 |

FOREIGN PATENTS

| | | |
|---|---|---|
| 428,413 | Germany | May 5, 1926 |